United States Patent
Gangadhar et al.

(10) Patent No.: US 10,001,939 B1
(45) Date of Patent: Jun. 19, 2018

(54) METHOD AND APPARATUS FOR HIGHLY AVAILABLE STORAGE MANAGEMENT USING STORAGE PROVIDERS

(71) Applicant: EMC IP Holding Company LLC, Hopkinton, MA (US)

(72) Inventors: Katakam Gangadhar, Bangalore (IN); Stalin Saravanakumar Thangapalam, Shrewsbury, MA (US); Selvamanickam Anbalagan, Madurai (IN); Michael G. Hegerich, Holliston, MA (US); Anil Arun Degwekar, Bangalore (IN); Anoop Ninan, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 14/319,777

(22) Filed: Jun. 30, 2014

(51) Int. Cl.
*G06F 12/10* (2016.01)
*G06F 3/06* (2006.01)

(52) U.S. Cl.
CPC .......... *G06F 3/0631* (2013.01); *G06F 3/0638* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 7,565,568 B1* | 7/2009 | Kumar | ................. | G06F 11/201 714/11 |
| 2003/0079019 A1* | 4/2003 | Lolayekar | ........... | H04L 67/1097 709/226 |
| 2006/0080569 A1* | 4/2006 | Sciacca | ................. | G06F 9/5083 714/4.1 |
| 2009/0077370 A1* | 3/2009 | Barabash | ............... | G06F 9/4405 713/100 |
| 2009/0157858 A1* | 6/2009 | Bolan | ............... | H04L 29/12207 709/223 |
| 2013/0036212 A1* | 2/2013 | Jibbe | ................... | H04L 67/1095 709/223 |
| 2015/0006950 A1* | 1/2015 | Gurram | ............... | G06F 11/2028 714/4.12 |

OTHER PUBLICATIONS

Representational state transfer (REST) definition by Google search, 2017.*
Jeff Goldner, INtroduction to SMI-S , Publish 2012 by Microsoft.*

* cited by examiner

*Primary Examiner* — Duc Doan
(74) *Attorney, Agent, or Firm* — Daly, Crowley, Mofford & Durkee, LLP

(57) ABSTRACT

Example embodiments of the present invention relate to a method, a system, and a computer program product for managing a plurality of storage providers to allocate a second storage provider as an active storage provider. The method includes monitoring respective health states of a plurality of storage providers in a storage infrastructure and determining an unhealthy health state of a first storage provider, operating as an active storage provider, among the plurality of storage providers. The method also includes managing the plurality of storage providers to allocate a second storage provider, operating as a standby storage provider, among the plurality of storage providers as the active storage provider.

15 Claims, 10 Drawing Sheets

(TIME 1 – SP1 ACTIVE)

FIG. 1 (TIME 1 – SP1 ACTIVE)

FIG. 2 (TIME 2 – SP1 DOWN)

FIG. 3 (TIME 3 – SP1 DOWN, SP2 ACTIVE)

FIG. 4 (TIME 4 – SP1 DOWN, SP2 ACTIVE)

FIG. 5 (TIME 5 – SP1 STANDBY, SP2 ACTIVE)

METHOD AND APPARATUS FOR HIGHLY AVAILABLE STORAGE MANAGEMENT USING STORAGE PROVIDERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,039 entitled "METHOD AND APPARATUS FOR AUTOMATED INFORMATION LIFE-CYCLE MANAGEMENT USING A FEDERATION OF ARRAYS", Ser. No. 13/631,055 entitled "METHOD AND APPARATUS FOR FEDERATED IDENTITY AND AUTHENTICATION SERVICES", Ser. No. 13/631,190 entitled "APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE" filed on Sep. 28, 2012; Ser. No. 13/886,644 entitled "STORAGE PROVISIONING IN A DATA STORAGE ENVIRONMENT", Ser. No. 13/886,786 entitled "DISTRIBUTED WORKFLOW MANAGER", Ser. No. 13/886,789 entitled "PORT PROVISIONING SYSTEM", Ser. No. 13/886,892 entitled "SCALABLE INDEX STORE", Ser. No. 13/886,687 entitled "STORAGE PROVISIONING IN A DATA STORAGE ENVIRONMENT", and Ser. No. 13/886,915 entitled "SCALABLE OBJECT STORE" filed on May 3, 2013; and Ser. No. 14/319,757, filed Jun. 30, 2014 Now U.S. Pat. No. 9,612,769, issued Apr. 4, 2017) entitled "METHOD AND APPARATUS FOR AUTOMATED MULTI SITE PROTECTION AND RECOVERY FOR CLOUD STORAGE", Ser. No. 14/315,438, filed Jun. 26, 2014, entitled "GLOBAL STORAGE RESOURCE MANAGEMENT", Ser. No. 14/319,772, filed Jun. 30, 2014, entitled "METHOD AND APPARATUS FOR AUTOMATED ORCHESTRATION OF LONG DISTANCE PROTECTION OF VIRTUALIZED STORAGE", Ser. No. 14/319,797, filed Jun. 30, 2014 (now U.S. Pat. No. 9,940,073, issued Apr. 10, 2018), entitled "METHOD AND APPARATUS FOR AUTOMATED SELECTION OF A STORAGE GROUP FOR STORAGE TIERING", Ser. No. 14/319,804, filed Jun. 30, 2014 (now U.S. Pat. No. 9,933,967, issued Apr. 3, 2018), entitled "METHOD AND APPARATUS FOR STORAGE MANAGEMENT USING VIRTUAL STORAGE ARRAYS AND VIRTUAL STORAGE POOLS", Ser. No. 14/313,104, filed Jun. 24, 2014 (now U.S. Pat. No. 9,710,194, issued Jul. 18, 2017), entitled "STORAGE PORT ALLOCATION BASED ON INITIATOR USAGE" filed on even date herewith, which are hereby incorporated herein by reference in their entirety.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

Often cloud computer may be performed with a data storage system. As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

SUMMARY

Example embodiments of the present invention relate to a method, a system, and a computer program product for managing a plurality of storage providers to allocate a second storage provider as an active storage provider. The method includes monitoring respective health states of a plurality of storage providers in a storage infrastructure and determining an unhealthy health state of a first storage provider, operating as an active storage provider, among the plurality of storage providers. The method also includes managing the plurality of storage providers to allocate a second storage provider, operating as a standby storage provider, among the plurality of storage providers as the active storage provider.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
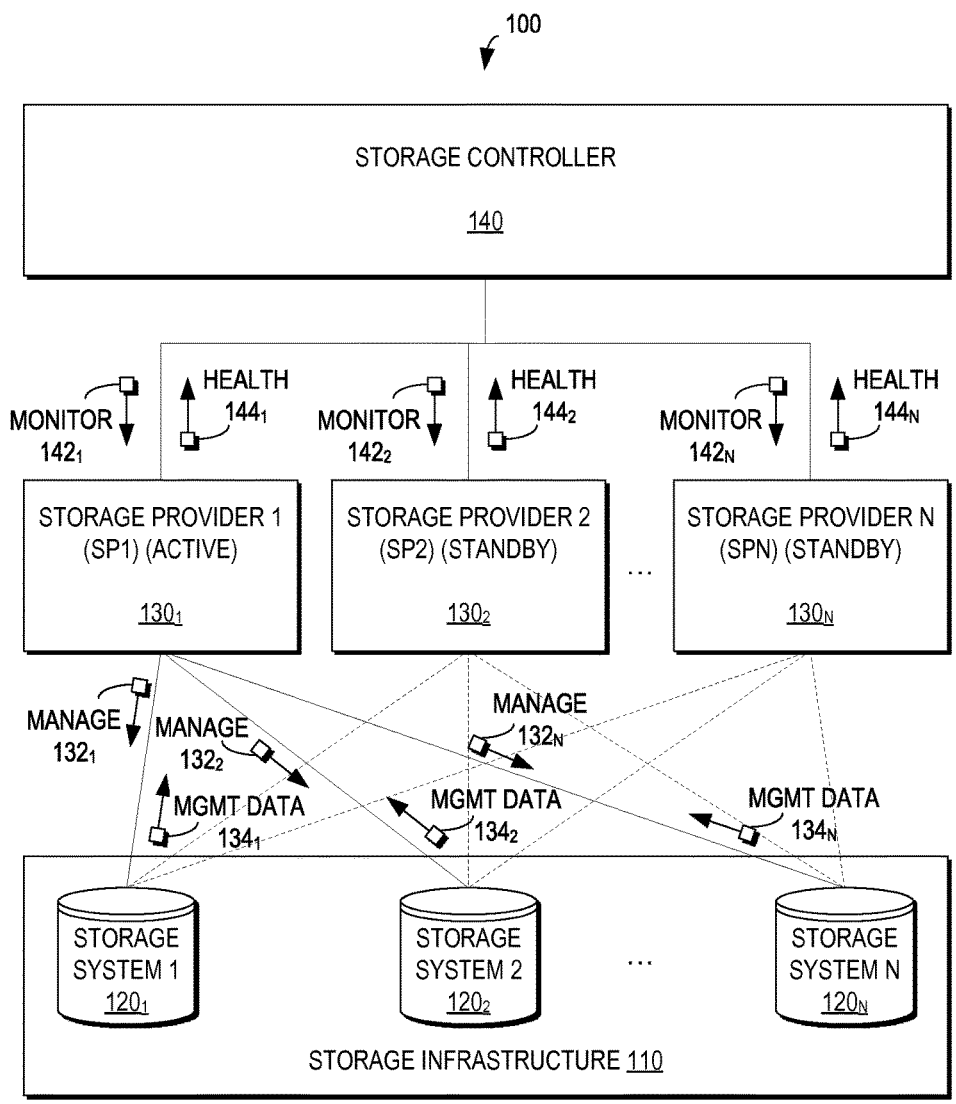
FIG. 1 is a block diagram of a system including a plurality of storage providers at a first time with a first storage provider in an active state and the remainder of the plurality of storage providers in a standby state according to an example embodiment of the present invention.

In a typical data center environment, storage providers should be used to manage underlying infrastructure components such as storage arrays and switches. Storage providers are management access points for the infrastructure components and may run on a host and provide an interface for storage systems accessible via that host or run on a storage system to manage one or more underlying storage arrays.

Storage providers support the Storage Networking Industry Association (SNIA) Storage Management Initiative (SMI), an American National Standards Institute (ANSI) standard for storage management. The SMI has developed a standard management interface that has culminated in a comprehensive specification (SMI-Specification or SMI-S) that defines an open storage management interface enabling the interoperability of multiple vendors' storage management technologies for monitoring and controlling storage resources in multi-vendor SAN topologies. SMI strives to ensure consistent data and eliminate inconsistencies between management tools by providing a unified interface to the many storage objects managed in a storage environment. This enables application developers to focus on a single, standard interface to develop storage management tools.

It should be understood that a single storage provider instance may support multiple data centers (e.g., virtual data centers) and, likewise, if a data center (e.g., virtual data center) deployment consists of multiple storage management deployment instances then a storage provider instance runs on each of the deployment instances.

In certain embodiments, a data center may be a cluster of VPLEX® storage systems by EMC Corporation of Hopkinton, Mass. A VPLEX Local configuration consists of a single VPLEX cluster, which may be managed by a storage management API through the one VPLEX storage providers associated with that cluster. A VPLEX Metro configuration consists of exactly two VPLEX clusters. Each of these two clusters has its own storage provider; however both clusters of a VPLEX Metro can be managed entirely through one storage provider. When a user manages a VPLEX storage system through the storage management API, the user may specify the IP address, port, and credentials for a VPLEX storage provider. In the case of a VPLEX Local configuration, the storage management API will discover the single VPLEX cluster and manage that VPLEX cluster as a storage system. In the case of a VPLEX Metro configuration, the storage management API will discover both VPLEX clusters from the specified storage provider and manage both VPLEX clusters together as a single storage system using the specified VPLEX storage provider. It should be understood that example embodiments of the present invention are equally applicable to other types of storage systems, including VMAX® and VNX® by EMC Corporation of Hopkinton, Mass. among others and the use of VPLEX, above, is only by means of an example and should not be considered limiting.

If a storage provider fails, goes down, and/or becomes inaccessible (i.e., is inactive) due to any hardware failure or due to any other unknown problem, the user loses the ability to manage the underlying storage system(s) until the storage provider comes back on line and is once again accessible. Therefore, business operations may be interrupted/discontinued.

Accordingly, example embodiments of the present invention overcome these and other deficiencies in traditional storage systems by providing redundancy at the storage provider level and deploy multiple storage providers to manage such infrastructure to provide high availability with zero downtime.

Data center management solutions are a layered solution and it is important to provide redundancy at each layer to support business continuity. Storage providers are proxy storage management endpoints that higher level applications can use to manage storage infrastructure. It is possible to deploy multiple storage providers and configure them to manage overlapping storage infrastructures. In such a configuration, it is possible to build intelligence into higher level applications to automatically failover to an alternate, standby storage provider when the current active storage provider becomes disabled.

As such, business continuity may be preserved with little to no impact on the application users. To achieve such high availability at the proxy management layer, in a preferred embodiment, there must be two or more storage providers with an identical view of a storage infrastructure component under management by the application. The connectivity and health for each storage provider may be monitored in order to determine its ability to perform the required services for the infrastructure component under management.

In a preferred embodiment, at any given time, one storage provider is assigned as the active provider for the infrastructure component and all other storage providers capable of managing the component are marked as standby. Management functions such as discovery, provisioning, performance, and event monitoring may be performed using the active storage provider. By actively monitoring the health of the storage providers, if the application determines that the active provider is no longer capable of servicing a component, the application can automatically promote an inactive, healthy storage provider to be the active provider for the component.

FIG. 1 is a block diagram of a system 100 including a plurality of storage providers at a first time with a first storage provider SP1 130$_1$ in an active state and the remainder of the plurality of storage providers SP2-SPN 130$_2$-130$_N$ in a standby state according to an example embodiment of the present invention. As illustrated in FIG. 1, the first storage provider SP1 130$_1$ is configured to manage a plurality of storage systems 1-N 120$_1$-120$_N$ in a storage infrastructure 110. As defined in, for example, the SMI-S standard, the active storage provider SP1 130$_1$ may, in general, send management controls and requests 132$_1$-132$_N$ to the respective storage systems 120$_1$-120$_N$ under its management and receive management data 134$_1$-134$_N$ in response thereto.

It should be understood that each of the storage providers SP1-SPN 130$_1$-130$_N$ is capable of managing the each storage system 1-N 120$_1$-120$_N$ but only the first active storage provider SP1 130$_1$ actually manages the storage systems. Further, it should be understood that the storage providers SP1-SPN 130$_1$-130$_N$ may be in a many-to-many relationship, with each storage system of the plurality of storage systems 1-N $120_1$-$120_N$ capable of being managed by a different storage provider active with respect to that storage system.

A storage controller 140, such as a storage management API provided by, for example, ViPR by EMC Corporation of Hopkinton, Mass., may monitor each of the storage providers SP1-SPN $130_1$-$130_N$ under its control. For example, as illustrated in FIG. 1, the storage controller 140 may periodically monitor $142_1$-$142_N$ (i.e., verify) the connectivity of all managed storage providers SP1-SPN $130_1$-$130_N$ and update their connectivity status (i.e., active, down, standby) according to a health response $144_1$-$144_N$ received thereto.

In the case of VPLEX, if a user adds a storage provider for a VPLEX Metro configuration cluster via, for example, the storage controller, a "scan" may be executed to discover which storage systems it can manage. In this case, the scan will find both VPLEX clusters and create a single storage system to represent this VPLEX Metro configuration. This storage provider will be tagged as the active (i.e., primary) storage provider for this VPLEX storage system and will be the primary interface for managing the storage system. If the user subsequently adds a second storage provider, when the scan is executed for this storage provider, the scan will find the same two VPLEX clusters but, instead of creating a new storage system, the storage controller may assign the already created storage system to the managed storage systems list for the storage provider. This storage provider will be a standby (i.e., secondary) storage provider for managing the storage system. It should be understood that, for a VPLEX Local configuration, there will always only be a single storage provider. In other words, when a storage provider entry is created in the storage controller, the storage provider may be scanned to determine what storage systems it is managing and the storage controller may store a topology of both the storage systems the storage provider is managing and the storage providers that may manage a particular storage system.

A storage controller 140 may monitor each of the storage providers SP1-SPN $130_1$-$130_N$ under its control. If at some point an active storage provider (e.g., storage provider SP1 $130_1$) loses connectivity, as will be described below with reference to FIGS. 2-4, the storage controller 140 may automatically promote a connected/available standby storage provider SP2-SPN $130_2$-$130_N$, if any, to be an active storage provider.

Figure 2:
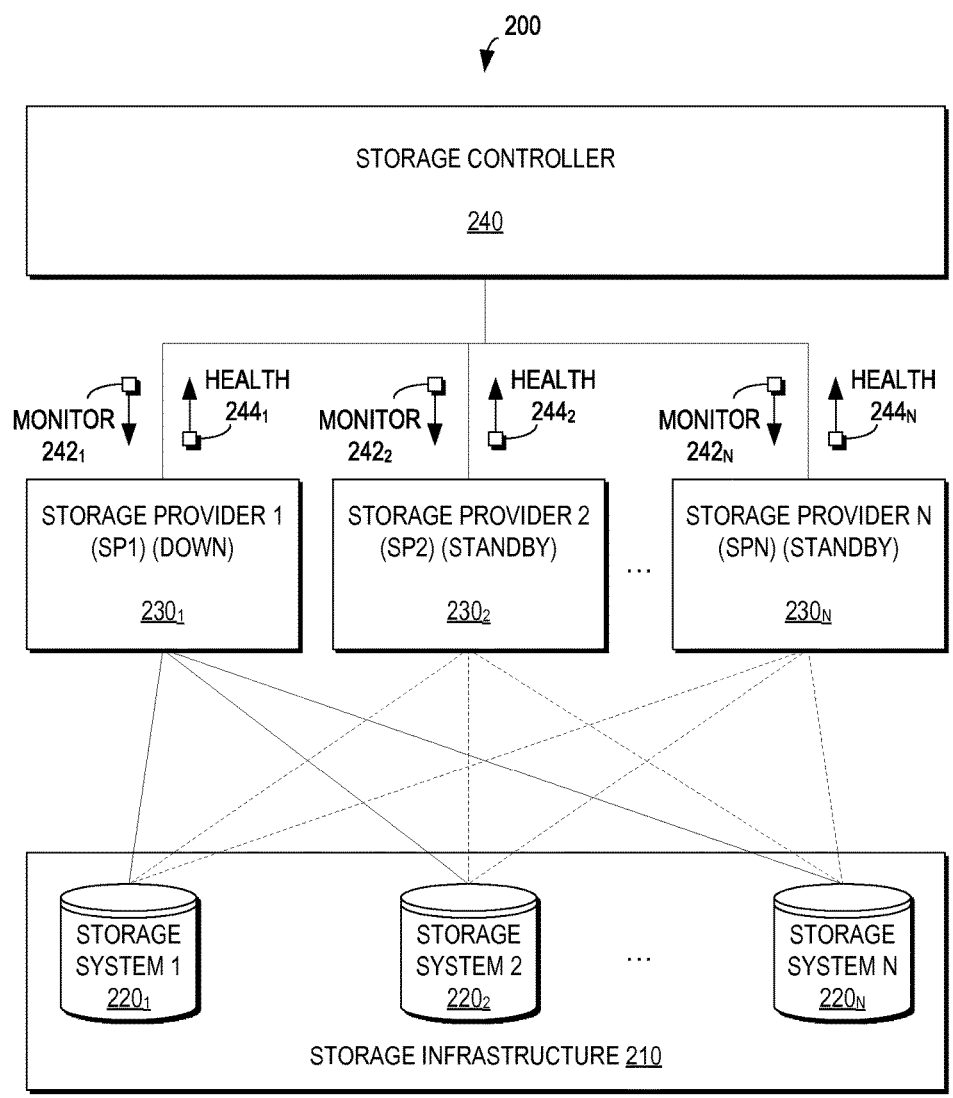
FIG. 2 is a block diagram of a system including a plurality of storage providers at a second time with a first storage provider in an inactive state and the remainder of the plurality of storage providers in a standby state according to an example embodiment of the present invention.

FIG. 2 is a block diagram of a system 200 including a plurality of storage providers at a second time with a first storage provider SP1 $230_1$ in a down (i.e., inactive) state and the remainder of the plurality of storage providers SP2-SPN $230_2$-$230_N$ in a standby state according to an example embodiment of the present invention. As illustrated in FIG. 2, none of the storage providers SP1-SPN $230_1$-$230_N$ currently is managing the plurality of storage systems 1-N $220_1$-$220_N$ in the storage infrastructure 210.

Figure 6:
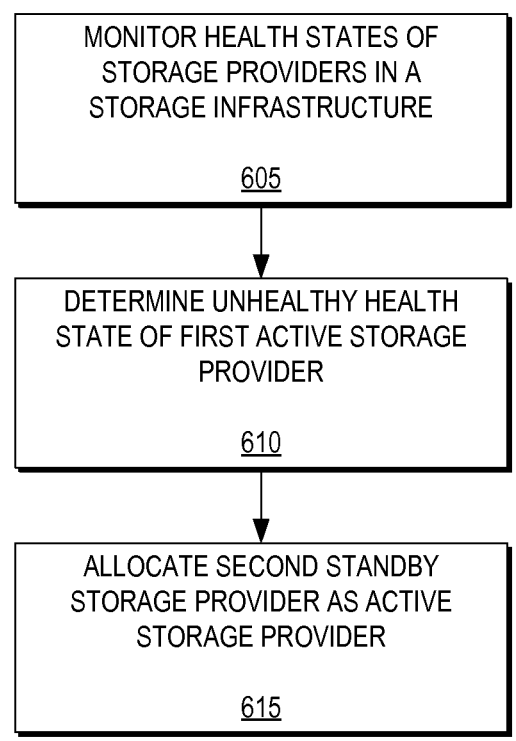
FIG. 6 is a flow diagram illustrating a method for allocating a standby storage provider as an active storage provider according to an example embodiment of the present invention.

FIG. 2 may be described in conjunction with FIG. 6 which is a flow diagram illustrating a method for allocating a standby storage provider SP2 $230_2$ as an active storage provider according to an example embodiment of the present invention. As illustrated in FIGS. 2 and 6, the storage controller 240 may periodically monitor $242_1$-$242_N$ (i.e., verify) the health states (i.e., connectivity) of all managed storage providers SP1-SPN $230_1$-$230_N$ (605) and update their connectivity status (e.g., active, down, standby) according to a health response $244_1$-$244_N$ received thereto. Accordingly, the storage controller may determine an unhealthy state of the first active storage provider SP1 $230_1$ (610) and update the connectivity status of the first storage provider SP1 $230_1$ to reflect that it has gone down.

Figure 3:
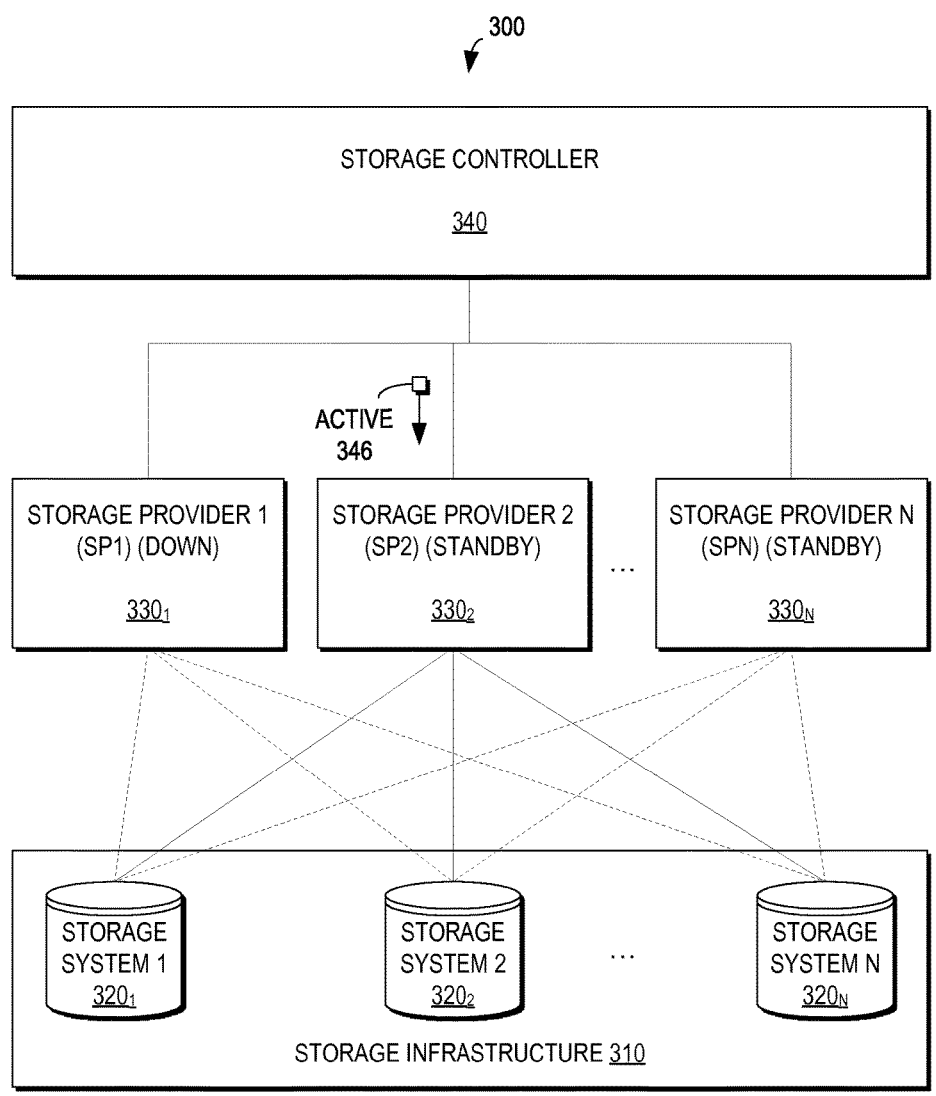
FIG. 3 is a block diagram of a system including a plurality of storage providers at a time third with a first storage provider in an inactive state, a second storage provider in a standby state, and the remainder of the plurality of storage providers in a standby state and an allocation signal from a storage controller to cause the second storage provider to be an active storage provider according to an example embodiment of the present invention.

FIG. 3 is a block diagram of a system 300 including a plurality of storage providers at a time third with a first storage provider SP1 $330_1$ in a down (i.e., inactive) state, the remainder of the plurality of storage providers SP2-SPN $330_2$-$330_N$ in a standby state, and an allocation signal 346 from a storage controller 340 to cause the second storage provider SP2 $330_2$ to be an active storage provider according to an example embodiment of the present invention. FIG. 3 may be described in conjunction with FIG. 6. As illustrated in FIGS. 3 and 6, after monitoring the connectivity status of the plurality of storage providers SP1-SPN $330_1$-$330_N$ (605) and determining that the active storage provider SP1 $330_1$ is down (610), the storage controller 340 may allocate a second standby storage provider SP2 $330_2$ as an active storage provider (615). In other words, the storage controller 340 may send a command 346 to a connected/available standby storage provider SP2-SPN $330_2$-$330_N$, if any, (e.g., storage provider SP2 $330_2$) to promote the standby second storage provider SP2 $330_2$ to be an active second storage provider SP2 $330_2$ (as shown in FIG. 4).

Figure 4:
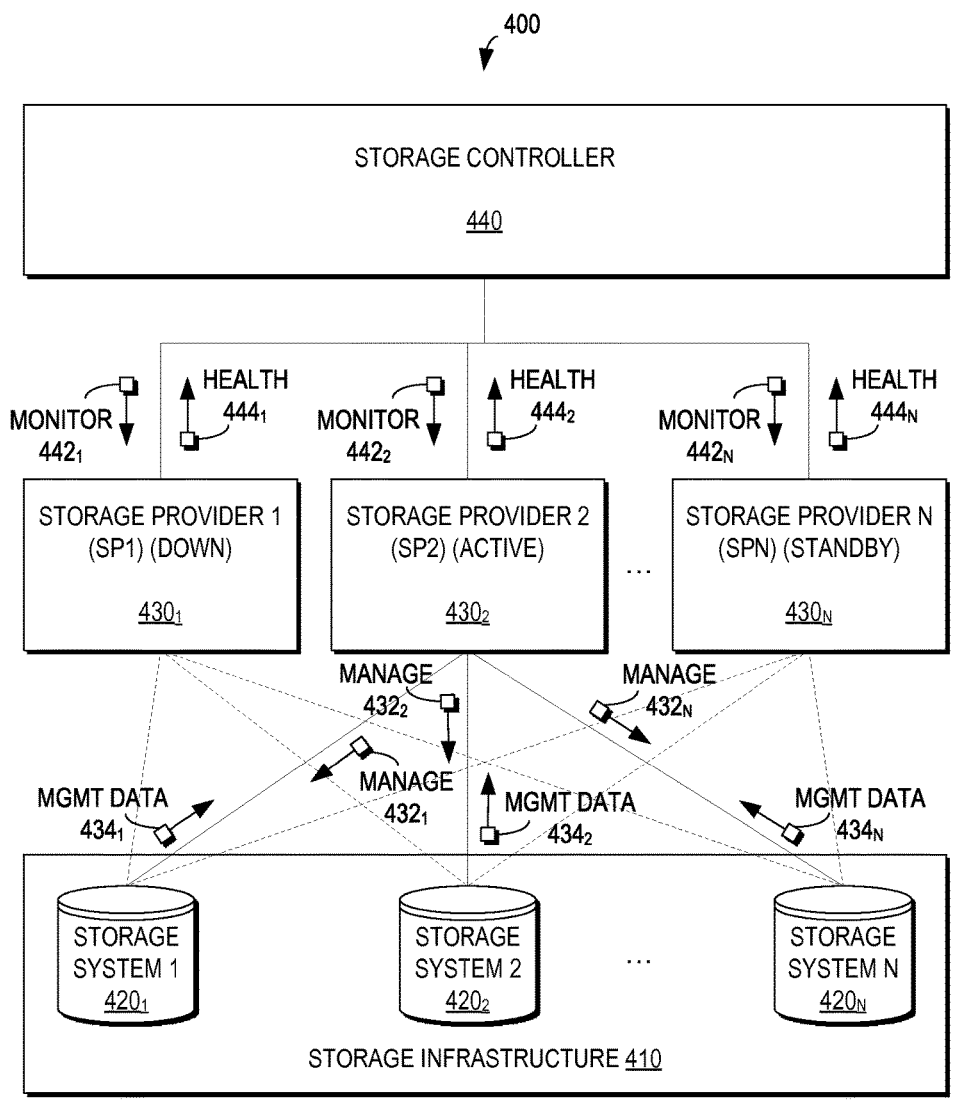
FIG. 4 is a block diagram of a system including a plurality of storage providers at a fourth time with a first storage provider in an inactive state, a second storage provider in an active state, and the remainder of the plurality of storage providers in a standby state according to an example embodiment of the present invention.

FIG. 4 is a block diagram of a system 400 including a plurality of storage providers at a fourth time with a first storage provider SP1 $430_1$ in a down (i.e., inactive) state, a second storage provider SP2 $430_2$ in an active state, and the remainder of the plurality of storage providers SP3-SPN $430_3$-$430_N$, if any, in a standby state according to an example embodiment of the present invention. As illustrated in FIG. 4, the second storage provider SP2 $430_2$ is now configured to manage a plurality of storage systems 1-N $420_1$-$420_N$ in a storage infrastructure 410.

As defined in, for example, the SMI-S standard, the active storage provider SP2 $430_2$ may, in general, send management controls and requests $432_1$-$432_N$ to the respective storage systems $420_1$-$420_N$ under its management and receive management data $434_1$-$434_N$ in response thereto. The storage controller 440 may monitor each of the storage providers SP1-SPN $430_1$-$430_N$ under its control. For example, as illustrated in FIG. 4, the storage controller 440 may periodically monitor $442_1$-$442_N$ (i.e., verify) the connectivity of all managed storage providers SP1-SPN $430_1$-$430_N$ and update their connectivity status (i.e., active, down, standby) according to a health response $444_1$-$444_N$ received thereto. It should be understood, however, that reference to the SMI-S standard for storage provider operation is only made for purposes of example, and should not be limiting, and that other interfaces such as representational state transfer (REST), may be used.

Figure 8:
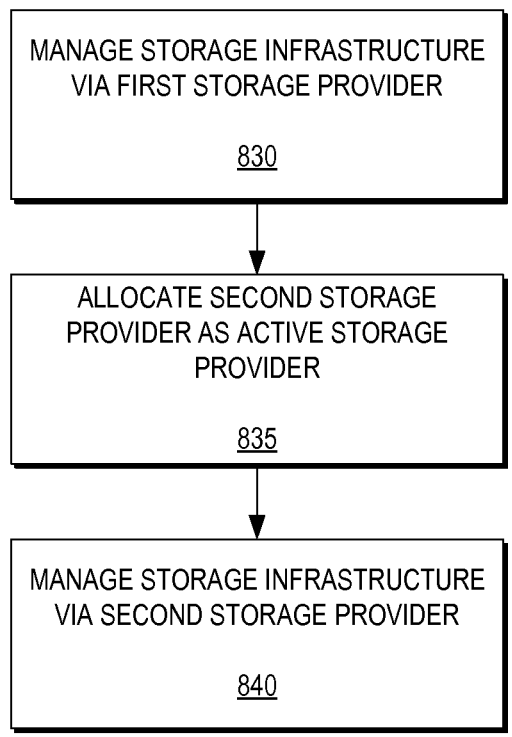
FIG. 8 is a flow diagram illustrating a method for managing a storage infrastructure via a second storage provider according to an example embodiment of the present invention.

Therefore, over the process described above with reference to FIGS. 1-4, as illustrated in FIG. 8 which is a flow diagram illustrating a method for managing a storage infrastructure via a second storage provider according to an example embodiment of the present invention, the storage controller 440 may (1) manage the storage infrastructure 410 via a first active storage provider SP1 $430_1$ (830), (2) determine an unhealthy health state of the first active storage providers SP1 $430_1$, (3) allocate a second standby storage provider SP2 $430_2$ as an active storage provider (835), and (4) manage the storage infrastructure 410 via the second active storage provider SP2 $430_2$ (840).

Figure 5:
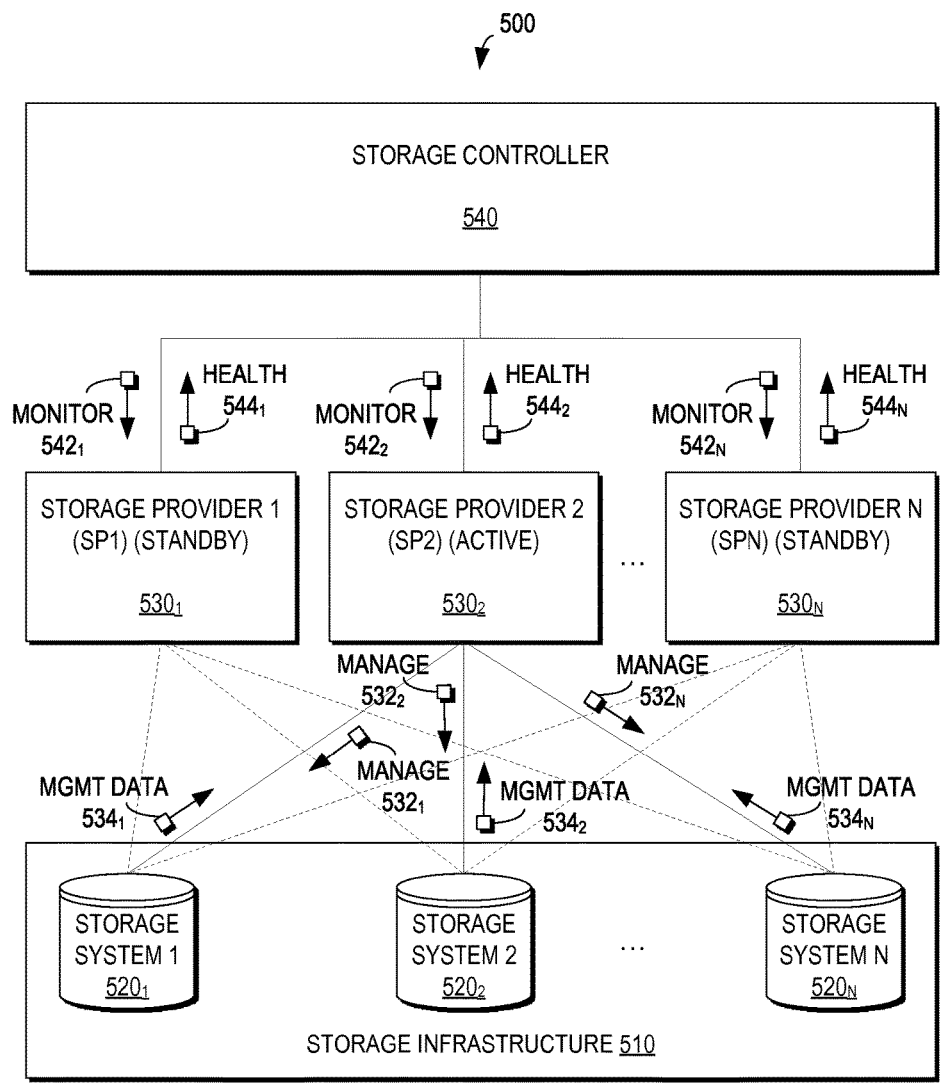
FIG. 5 is a block diagram of a system including a plurality of storage providers at a fifth time with a first storage provider in a standby state, a second storage provider in an active state, and the remainder of the plurality of storage providers in a standby state according to an example embodiment of the present invention.
Figure 7:
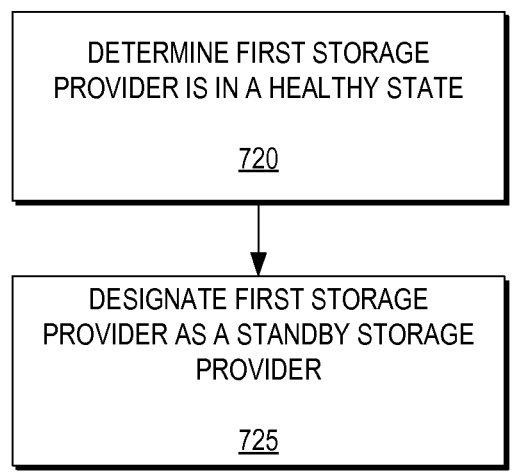
FIG. 7 is a flow diagram illustrating a method for designating an inactive first storage provider as a standby storage provider according to an example embodiment of the present invention.

FIG. 5 is a block diagram of a system 500 including a plurality of storage providers at a fifth time with a first storage provider SP1 $530_1$ in a standby state, a second storage provider SP2 $530_2$ in an active state, and the remainder of the plurality of storage providers SP3-SPN $530_3$-$530_N$, if any, in a standby state according to an example embodiment of the present invention. FIG. 5 may be described in conjunction with FIG. 7 which is a flow diagram illustrating a method for designating an inactive first storage provider SP1 $530_1$ as a standby storage provider according to an example embodiment of the present invention. A storage controller 540 may monitor each of the storage providers SP1-SPN $530_1$-$530_N$ under its control. If at some point a down storage provider (e.g., storage provider SP1 $530_1$) regains connectivity and the storage controller 540 determines that the first storage provider $530_1$ is in a healthy state (720), as illustrated in FIG. 5, the storage controller 540 may automatically designate the reconnected storage provider (e.g., storage provider SP1 $530_1$) to be a standby storage provider (725), thereby allowing the reconnected standby storage provider (e.g., storage provider SP1 $530_1$) to join the remaining connected/available standby storage providers SP3-SPN $530_3$-$530_N$, if any, to act as backup storage providers should the active storage provider SP2 $530_2$ go down or otherwise become unavailable.

Figure 9:
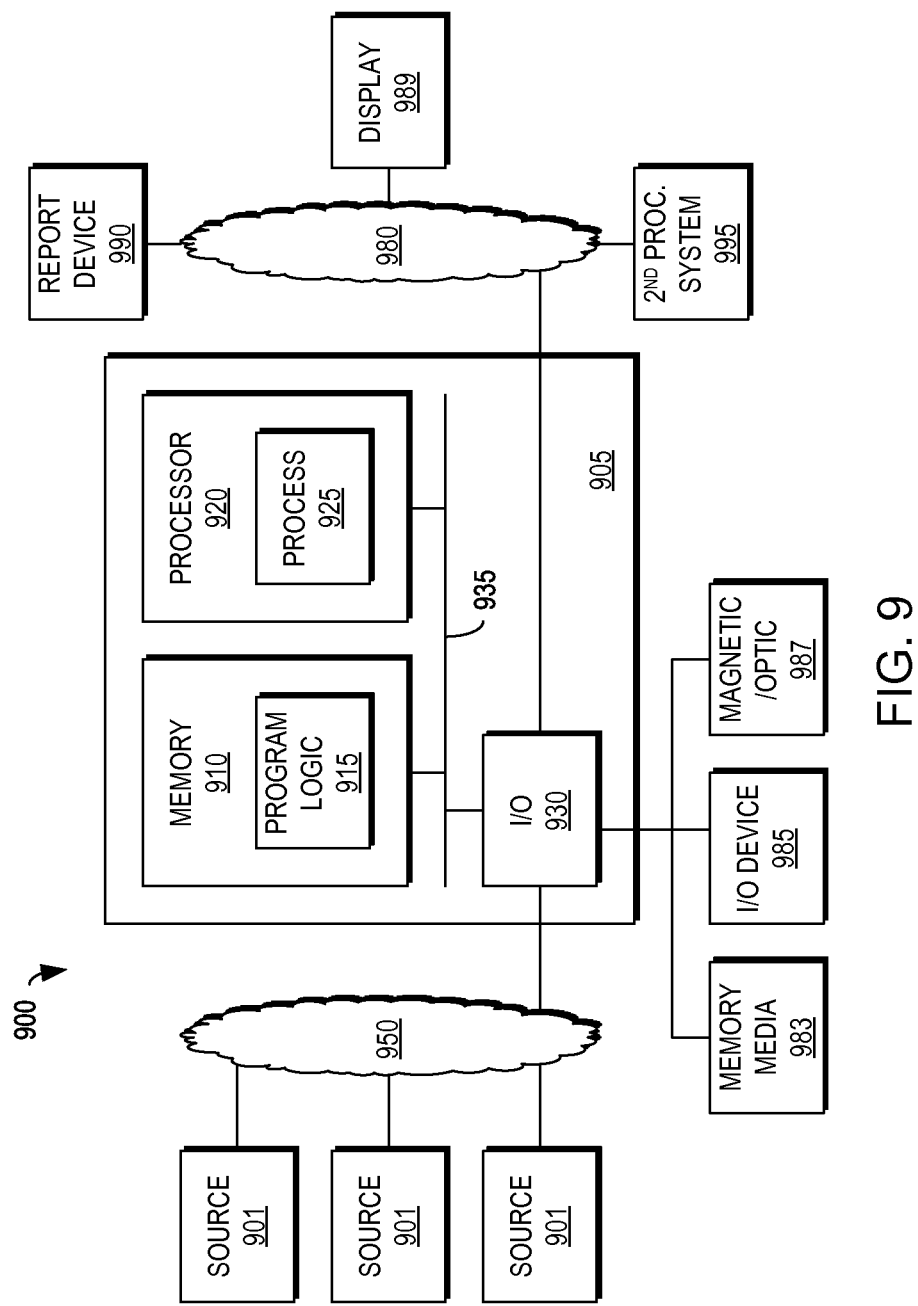
FIG. 9 is a block diagram of an apparatus according to an example embodiment the present invention.

FIG. 9 is a block diagram of an example embodiment apparatus 905 according to the present invention. The apparatus 905 may be part of a system 900 and includes memory 910 storing program logic 915, a processor 920 for executing a process 925, and a communications I/O interface 930, connected via a bus 935.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

Figure 10:
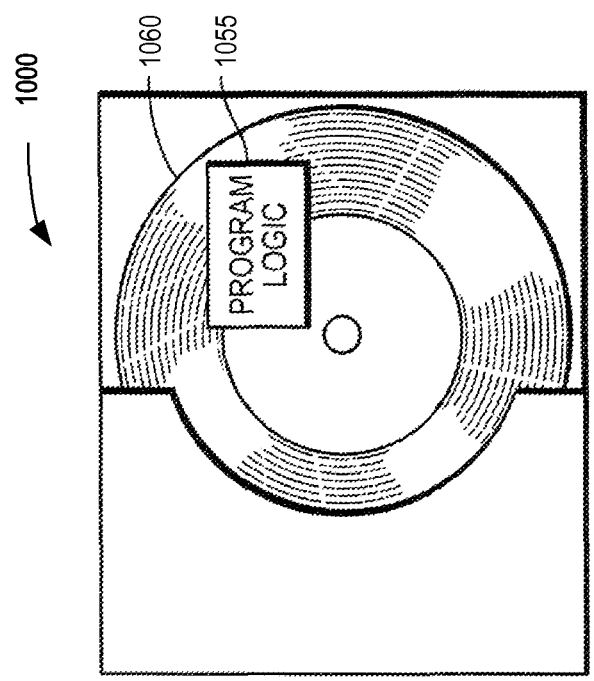
FIG. 10 is a block diagram of a computer program product including program logic, encoded on a computer-readable medium in computer-executable code configured for carrying out the methods of the invention, according to an example embodiment of the present invention.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. FIG. 10 is a block diagram of a computer program product 1000 including program logic 1055, encoded on a computer-readable medium 1060 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
receiving and monitoring, by a storage controller, respective connectivity health states of each of a plurality of storage providers in a storage infrastructure, wherein the storage infrastructure comprises a plurality of storage systems, and wherein the plurality of storage providers includes a first storage provider operating as an active storage provider configured to manage the plurality of storage systems, and a second storage provider operating as a standby storage provider, the plurality of storage providers in a control path of the storage infrastructure and configured to manage the plurality of storage systems, wherein the plurality of storage providers are each defined by an open storage management interface enabling interoperability of multiple vendor storage management technologies for monitoring and controlling storage resources at the plurality of storage systems, wherein the plurality of storage providers function as proxy storage endpoints that higher level applications use to manage storage infrastructure, and wherein at least two storage providers manage overlapping devices within the storage infrastructure;
determining an unhealthy connectivity health state of the first storage provider and receiving a status of the unhealthy connectivity health state at the storage controller;
managing, by the storage controller, the plurality of storage providers to allocate and designate the second storage provider as the active storage provider to manage the plurality of storage systems in place of the first storage provider having the unhealthy connectivity health state; and
wherein only one storage provider among the plurality of storage providers operates as the active storage provider at any time; and wherein the other of the plurality of storage providers in respective healthy connectivity states operate as respective inactive standby storage providers.

2. The method of claim 1 wherein the active storage provider performs management functions for the storage infrastructure.

3. The method of claim 2 wherein the management functions include discovery and provisioning of resources in, data collection from, and monitoring of the storage infrastructure.

4. The method of claim 1 further comprises: determining, by the storage controller, the first storage provider among the plurality of storage providers is in a healthy connectivity state; and designating, by the storage controller, the first storage provider to operate as one of the standby storage providers.

5. The method of claim 1 wherein the determining further comprises detecting, by the storage controller, a failure of the first storage provider.

6. The method of claim 1 wherein the open storage management interface provides a unified interface to storage objects of the multiple vendor storage management technologies.

7. The method of claim 1 wherein the open storage management interface is a representational state transfer interface.

8. A system comprising:
a storage controller,
a plurality of storage providers;
a plurality of storage systems, wherein the plurality of storage providers are each defined by an open storage management interface enabling interoperability of multiple vendor storage management technologies for monitoring and controlling: storage resources at the plurality of storage systems, wherein the plurality of storage providers function as proxy storage endpoints that higher level applications use to manage storage infrastructure, and wherein at least two storage providers manage overlapping devices within the storage infrastructure; and
computer executable logic configured to enable one or more processors of the system to perform operations of:
receiving and monitoring, by the storage controller, respective connectivity health states of each of a plurality of storage providers in a storage infrastructure, wherein the storage infrastructure comprises a plurality of storage systems, and wherein the plurality of storage providers includes a first storage provider operating as an active storage provider configured to manage the plurality of storage systems, and a second storage provider operating as a standby storage provider, the plurality of storage providers in a control path of the storage infrastructure and configured to manage the plurality of storage systems;
determining an unhealthy connectivity health state of the first storage provider and receiving a status of the connectivity health state at the storage controller;
managing, by the storage controller, the plurality of storage providers to allocate and designate the second storage provider as the active storage provider to manage the plurality of storage systems in place of the first storage provider having the unhealthy connectivity health state; and
wherein only one storage provider among the plurality of storage providers operates as the active storage provider at any time; and wherein the other of the plurality of storage providers in respective healthy connectivity states operate as respective inactive standby storage providers.

9. The system of claim 8 wherein the active storage provider performs management functions for the storage infrastructure.

10. The system of claim 9 wherein the management functions include discovery and provisioning of resources in, data collection from, and monitoring of the storage infrastructure.

11. The system of claim 8 further comprises: determining, by the storage controller, the first storage provider among the plurality of storage providers is in a healthy connectivity state; and designating, by the storage controller, the first storage provider to operate as one of the standby storage providers.

12. The system of claim 8 wherein the determining further comprises detecting a failure of the first storage provider.

13. The system of claim 8 wherein the open storage management interface provides a unified interface to storage objects of the multiple vendor storage management technologies.

14. The system of claim 8 wherein the open storage management interface is a representational state transfer interface.

15. A computer program product including a non-transitory computer readable storage medium have computer program code encoded thereon that, when executed on one or more processors of a system, causes the system to manage a plurality of storage providers to allocate a second storage provider as an active storage provider, the computer program code comprising:
computer program code for monitoring respective health states of a plurality of storage providers in a storage infrastructure, wherein the storage infrastructure comprises a plurality of storage systems, and wherein the plurality of storage providers includes a first storage provider operating as an active storage provider configured to manage the plurality of storage systems, and a second storage provider operating as a standby storage provider, the plurality of storage providers in a control path of the storage infrastructure and configured to manage the plurality of storage systems, wherein the plurality of storage providers function as proxy storage endpoints that higher level applications use to manage storage infrastructure, and wherein at least two storage providers manage overlapping devices within the storage infrastructure;
computer program code for determining an unhealthy connectivity state of a first storage provider, transmitting a status of the unhealthy connectivity state, and operating as an active storage provider and configured to manage the plurality of storage systems comprising the storage infrastructure, among the plurality of storage providers;
computer program code for managing the plurality of storage providers to allocate and designate the second storage provider as the active storage provider to manage the plurality of storage systems in place of the first storage provider having the unhealthy connectivity state, wherein the plurality of storage providers are each defined by an open storage management interface enabling interoperability of multiple vendor storage management technologies for monitoring and controlling storage resources at the plurality of storage; and
wherein only one storage provider among the plurality of storage providers operates as the active storage provider at any time; and wherein the other of the plurality of storage providers in respective healthy connectivity states operate as respective inactive standby storage providers.

* * * * *